(12) United States Patent
Tsier et al.

(10) Patent No.: US 8,467,403 B2
(45) Date of Patent: Jun. 18, 2013

(54) COORDINATED UPDATING OF FORWARDING INFORMATION BASES IN A MULTISTAGE PACKET SWITCHING DEVICE

(75) Inventors: Yuri Tsier, Kanata (CA); Parag Kumar Jain, Stittsville (CA); Clarence Filsfils, Brussels (BE); Sami Boutros, San Ramon, CA (US); John H. W. Bettink, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 515 days.

(21) Appl. No.: 12/769,946

(22) Filed: Apr. 29, 2010

(65) Prior Publication Data

US 2011/0268130 A1 Nov. 3, 2011

(51) Int. Cl.
*H04L 12/28* (2006.01)

(52) U.S. Cl.
USPC .............................. 370/420; 370/419; 398/51

(58) Field of Classification Search
USPC .................................... 370/420, 419; 398/51
See application file for complete search history.

(56) References Cited

U.S. PATENT DOCUMENTS

| | | | |
|---|---|---|---|
| 6,671,256 B1 * | 12/2003 | Xiong et al. | 370/230 |
| 6,735,198 B1 | 5/2004 | Edsall et al. | |
| 7,292,569 B1 | 11/2007 | Smith et al. | |
| 7,499,447 B2 | 3/2009 | Shenoy et al. | |
| 7,826,369 B2 * | 11/2010 | Filsfils et al. | 370/235 |
| 7,835,312 B2 | 11/2010 | Shand et al. | |
| 7,885,260 B2 | 2/2011 | Paul et al. | |
| 2006/0140185 A1 | 6/2006 | Norman et al. | |
| 2009/0103490 A1 * | 4/2009 | Lakshmikanthan et al. | 370/331 |
| 2009/0109852 A1 | 4/2009 | Grover et al. | |
| 2011/0075680 A1 * | 3/2011 | Sun et al. | 370/419 |

OTHER PUBLICATIONS

Francis et al., "FIB Suppression with Virtual Aggregation and Default Routes," draft-francis-idr-intra-va-01.txt, Internet Engineering Task Force, Sep. 15, 2008, (33 pages).
Trotter, "Terminology for Forwarding Information Base (FIB) based Router Performance," RFC 3222, The Internet Society, Dec. 2001, (15 pages).

* cited by examiner

*Primary Examiner* — Wei Zhao
(74) *Attorney, Agent, or Firm* — The Law Office of Kirk D. Williams

(57) ABSTRACT

Disclosed are, inter alia, methods, apparatus, computer-storage media, mechanisms, and means associated with the coordinated updating of forwarding information bases (FIBs) in a multistage packet switching device, which performs at least lookup operations on multiple different FIBs in determining how to forward a packet. One embodiment uses lookup operations on two different FIBs, with these being an ingress FIB on an ingress line card and an egress FIB on an egress line card. In response to a change in the forwarding information for a stream of packets, the egress FIBs are first updated to include both the old and new forwarding information. After all egress FIBs have been updated, the ingress FIBs are updated to use the new forwarding information. This update procedure is designed to eliminate loss or duplication of packets induced during the updating of these FIBs to use the new forwarding information.

16 Claims, 5 Drawing Sheets

US 8,467,403 B2

COORDINATED UPDATING OF FORWARDING INFORMATION BASES IN A MULTISTAGE PACKET SWITCHING DEVICE

TECHNICAL FIELD

The present disclosure relates generally to multistage packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

A multistage packet switching device uses multiple forwarding table lookup operations to determine how to forward a packet through, and from, the packet switching device. For example, a packet is received on an ingress line card. A first lookup operation is performed in an ingress forwarding table thereon to determine an egress line card to which the packet is then forwarded. A lookup operation is then performed in an egress lookup table on the egress line card to identify from which interface of the egress line card to forward the packet.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
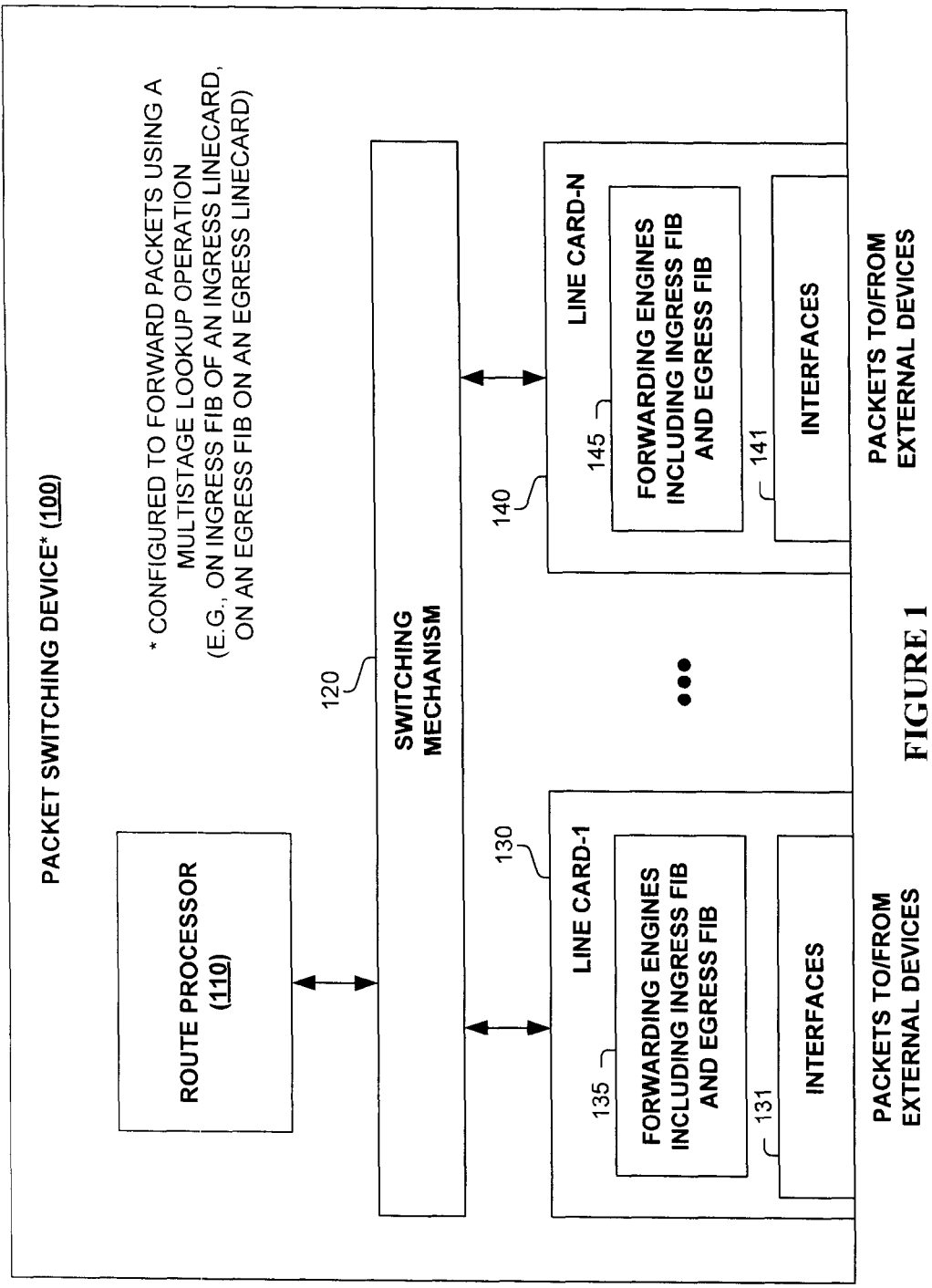
FIG. 1 illustrates a packet switching device operating according to one embodiment.

Disclosed are, inter alia, methods, apparatus, computer-storage media, mechanisms, and means associated with the coordinated updating of forwarding information bases (FIBs) in a multistage packet switching device, which performs at least lookup operations on multiple different FIBs in determining how to forward a packet. One embodiment uses lookup operations on two different FIBs, with these being an ingress FIB on an ingress line card and an egress FIB on an egress line card. Note, a line card is an "ingress line card" if it is configured to receive packets from an external source; a line card is an "egress line card" if it is configured to send packets from the packet switching device; and a line card of a packet switching device can be either, or both, ingress and egress line cards.

One embodiment includes a method performed by a packet switching device, with the method comprising: programming both an ingress forwarding information base (FIB) and an egress FIB on each of a plurality of line cards of a packet switching device for performing multistage lookup operations for forwarding packets of a stream of packets exiting the packet switching device from a first interface of one of the plurality of line cards The packet switching device updates said egress FIB on each of the plurality of line cards to include forwarding information for the stream of packets exiting the second interface while said ingress FIB on each of the plurality of line cards still reflects the stream of packets exiting the first interface. In response to identifying that said egress FIB has been said updated on each of the plurality of line cards: said ingress FIB on each of the plurality of line cards are updated to reflect the stream of packets exiting the second interface.

In one embodiment, said multistage lookup operation for forwarding a packet of the stream of packets includes: performing an ingress lookup operation in said ingress FIB of one of the plurality of line cards resulting at least in the identification of a particular line card of the plurality of line cards, and performing an egress lookup operation in said egress FIB of the particular line card. The lookup operation in said ingress FIB also identifies an egress FIB identifier associated with a packet being sent through the packet switch. The egress lookup operation is performed using the egress FIB identifier as a lookup key. The operation of updating said egress FIB on each of the plurality of line cards to additionally include forwarding information for the stream of packets exiting the second interface includes: updating said egress FIB on each of the plurality of line cards to include a different egress FIB identifier for the stream of packets exiting the second interface, with said different egress FIB identifier being different than the egress FIB identifier for the stream of packets exiting the first interface.

2. Description

Disclosed are, inter alia, methods, apparatus, computer-storage media, mechanisms, and means associated with the coordinated updating of forwarding information bases (FIBs) in a multistage packet switching device. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with the coordinated updating of forwarding information bases (FIBs) in a multistage packet switching device, which performs at least lookup operations on multiple different FIBs in determining how to forward a packet. One embodiment includes a method, comprising: programming, by a packet switching device, both an ingress forwarding information base (FIB) and an egress FIB on each of a plurality of line cards of a packet switching device for performing multistage lookup operations for forwarding packets of a stream of packets exiting the packet switching device from a first interface of one of the plurality of line cards; updating, by the packet switching device, said egress FIB on each of the plurality of line cards to include forwarding information for the stream of packets exiting the second interface while said ingress FIB on each of the plurality of line cards still reflects the stream of packets exiting the first interface; and in response to identifying that said egress FIB has been said updated on each of the plurality of line cards: updating said ingress FIB on each of the plurality of line cards to reflect the stream of packets exiting the second interface.

In one embodiment, subsequent to beginning and before completing said operation of updating said ingress FIB on each of the plurality of line cards to reflect the stream of packets exiting the second interface: at least one packet of the stream of packets is forwarded from the first interface, and at least one packet of the stream of packets is forwarded from the second interface.

In one embodiment, said multistage lookup operation for forwarding a packet of the stream of packets includes: performing an ingress lookup operation in said ingress FIB of one of the plurality of line cards resulting at least in the identification of a particular line card of the plurality of line cards, and performing an egress lookup operation in said egress FIB of the particular line card; wherein said lookup operation in said ingress FIB also identifies an egress FIB identifier associated with a packet being sent through the packet switch; wherein said egress lookup operation is performed using the egress FIB identifier as a lookup key; and wherein said operation of updating said egress FIB on each of the plurality of line cards to additionally include forwarding information for the stream of packets exiting the second interface includes: updating said egress FIB on each of the plurality of line cards to include a different egress FIB identifier for the stream of packets exiting the second interface, with said different egress FIB identifier being different than the egress FIB identifier for the stream of packets exiting the first interface.

In one embodiment, the egress FIB identifier is not included in a packet of the stream of packets exiting the packet switching device. In one embodiment, subsequent to completing said operation of updating said ingress FIB on each of the plurality of line cards to reflect the stream of packets exiting the second interface, said egress FIB on each of the plurality of line cards is updated to remove forwarding information for the stream of packets exiting the first interface which includes removing the egress FIB identifier for the stream of packets exiting the first interface. In one embodiment, said operation of identifying said egress FIB has been updated on each of the plurality of line cards includes: waiting until each of the plurality of line cards has acknowledged that their respective egress FIB has been updated. In one embodiment, said operation of identifying said egress FIB has been updated on each of the plurality of line cards includes: waiting at least a predetermined maximum updated time duration.

One embodiment includes a packet switching device, comprising: a plurality of line cards, including: a particular line card configured to receive packets of a particular stream of packets; wherein at least two line cards of the plurality of line cards are configured for sending packets from the packet switch; one or more switching mechanisms for communicating packets between the plurality of line cards; and a route processor; wherein the particular line card includes an ingress forwarding information base (FIB); wherein the particular line card is configured to perform a lookup operation, for each particular packet of the particular stream of packets, in the ingress FIB to identify a specific line card of said at least two line cards, and a current egress FIB identifier; wherein each of said at least two line cards includes its own egress FIB; wherein each of said at least two line cards is configured to perform a lookup operation based on the current egress FIB identifier associated with a specific packet to identify forwarding information for the specific packet, and to forward the specific packet according to said forwarding information; and wherein the ingress FIB is configured to produce a first value as the current egress FIB identifier for said packets of the particular stream of packets, and each of said egress FIBs are configured for identifying forwarding information for said packets of the stream of packets based on the first value; wherein the route processor is configured to update forwarding information in the ingress FIB and each of said egress FIBs, including: updating each of said egress FIBs to associate new forwarding information for the particular stream of packets with a second value, and ensuring that each of said egress FIBs are said updated before updating the ingress FIB to use the second value instead of the first value as the current egress FIB identifier for said packets of the particular stream of packets.

In one embodiment, the current egress FIB identifier is not propagated outside the packet switching device in one of said packets of the particular stream of packets. In one embodiment, each of said egress FIBs includes forwarding information for the particular stream of packets for both (a) the first value as the current egress FIB identifier and (b) the second value as the current egress FIB identifier, prior to said updating the ingress FIB to use the second value instead of the first value as the current egress FIB identifier for said packets of the particular stream of packets. In one embodiment, the particular stream of packets correspond to packets within a packet tunnel; and wherein said updating of the forwarding information in the ingress FIB and each of said egress FIBs is performed in response to re-optimization of the packet tunnel. In one embodiment, the ingress FIB is configured to result in the identification of a different line card of said at least two line cards as the specific line card when the first value is the current egress FIB identifier than when the second value is the current egress FIB identifier.

In one embodiment, the ingress FIB is configured to result in the identification of a different line card of said at least two line cards as the specific line card when the first value is the current egress FIB identifier than when the second value is the current egress FIB identifier. In one embodiment, the ingress FIB is configured to result in the first value as the current egress FIB identifier of said packets of the particular stream until all of said egress FIBs are said updated to associate new forwarding information for the particular stream of packets with the second value. In one embodiment, said operation of ensuring that each of said egress FIBs are said updated includes receiving an acknowledgment from each of said at least two line cards that their respective egress FIB of said egress FIBs has been updated. In one embodiment, said operation of ensuring that each of said egress FIBs are said updated includes waiting at least a predetermined maximum updated time duration.

One embodiment includes a method, comprising: programming, by a packet switching device, both an ingress forwarding information base (FIB) and an egress FIB on each of a plurality of line cards of the packet switching device for use in multistage lookup operations for forwarding packets over a tunnel exiting the packet switching device from a first interface of one of the plurality of line cards; subsequent to said programming operation: updating, by the packet switching device, said egress FIB on each of the plurality of line cards to include forwarding information for the tunnel exiting the second interface in addition to forwarding information for the tunnel exiting the first interface; and updating said ingress FIB on each of the plurality of line cards to reflect the tunnel exiting the second interface subsequent to completion of said operation of updating said egress FIB on each of the plurality of line cards to include forwarding information for the tunnel exiting the second interface.

In one embodiment, subsequent to said egress FIB being updated on each of the plurality of line cards and completion of said operation of updating said ingress FIB on each of the plurality of line cards to reflect the tunnel exiting the second interface: at least one packet is forwarded from the tunnel from the first interface, and at least one packet is forwarded from the tunnel from the second interface. In one embodiment, a multistage lookup operation of said multistage lookup operations includes: performing an ingress FIB lookup operation in one of said ingress FIBs resulting in the identification of an egress FIB identifier internal to the packet switch, and performing an egress lookup operation using the egress FIB identifier as a lookup key in one of said egress FIBs in identifying how to forward the packet from the packet switching device; and wherein said operation of updating said egress FIB on each of the plurality of line cards to additionally include forwarding information for the tunnel exiting the second interface includes updating said egress FIB on each of the plurality of line cards to include a different egress FIB identifier corresponding to the second interface, with said different egress FIB identifier being different than the egress FIB identifier for the tunnel exiting the first interface. In one embodiment, a path of the tunnel taken through the packet switching device is changed to exit the second interface in response to re-optimization of the tunnel.

Expressly turning to the figures, FIG. 1 illustrates packet switching device 100 of one embodiment. As shown, packet switching device 100 includes route processor 110, line cards 130, 140, which are communicatively coupled via switching mechanism 120. Each of line cards 130, 140 include: forwarding engines (135, 145) for performing lookup operations for packet on ingress and/or egress FIBs; and interfaces (131, 141) for sending and/or receiving packets. Packet switching device 100 is configured to forward packets using multiple lookup operations, such as, but not limited to: an ingress lookup operation on an ingress FIB typically at least to determine the corresponding egress line card for a packet; and an egress lookup operation on an egress FIB to determine which interface (e.g., port) from which to forward the packet. Route processor 110 is configured to update the FIBs in line cards 130, 140 in response to new routes and routing changes for streams of unicast or multicast packets (e.g., packet flows, tunnels, distribution trees, etc.) in a manner designed to prevent packet loss or duplication, such as that caused when unsynchronized FIBs are used in multistage packet forwarding operations.

Figure 2:
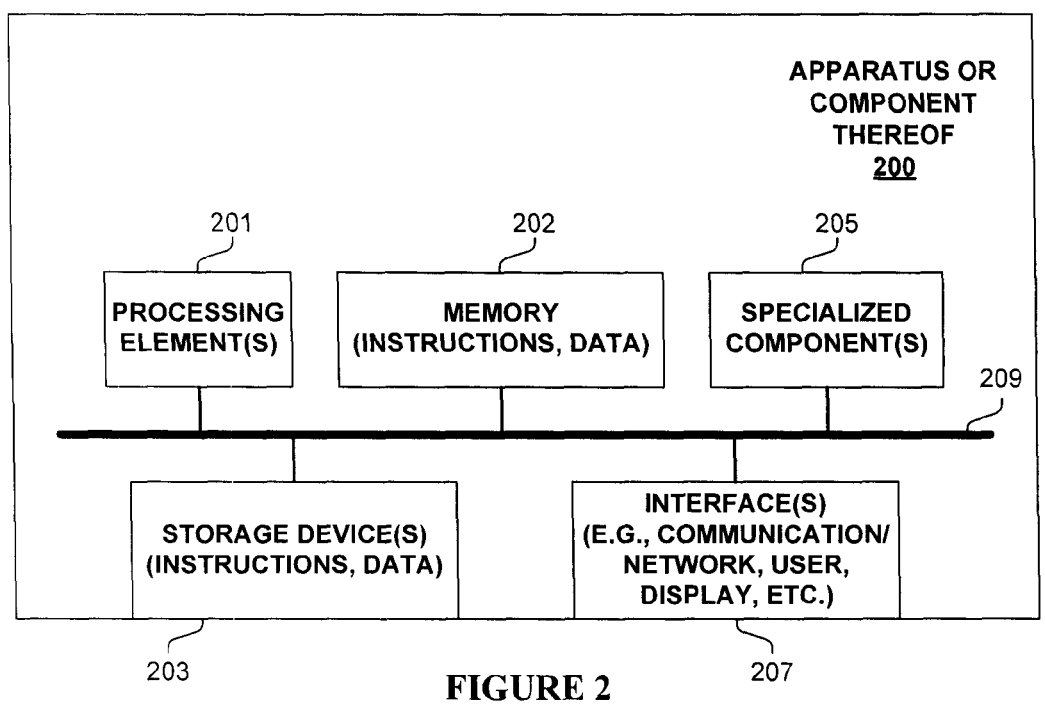
FIG. 2 illustrates an apparatus or component used in one embodiment.

FIG. 2 is block diagram of an apparatus or component 200 used in one embodiment associated with the coordinated updating of forwarding information bases (FIBs) in a multistage packet switching device. In one embodiment, apparatus or component 200 performs one or more processes corresponding to one of the flow, block, or other diagrams illustrated or otherwise described herein.

In one embodiment, apparatus or component 200 includes one or more processing element(s) 201, memory 202, storage device(s) 203, specialized component(s) 205 [e.g. optimized hardware such as for performing lookup operations (e.g., content-addressable memories, ternary content-addressable memories) etc.], and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, network device 10 of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
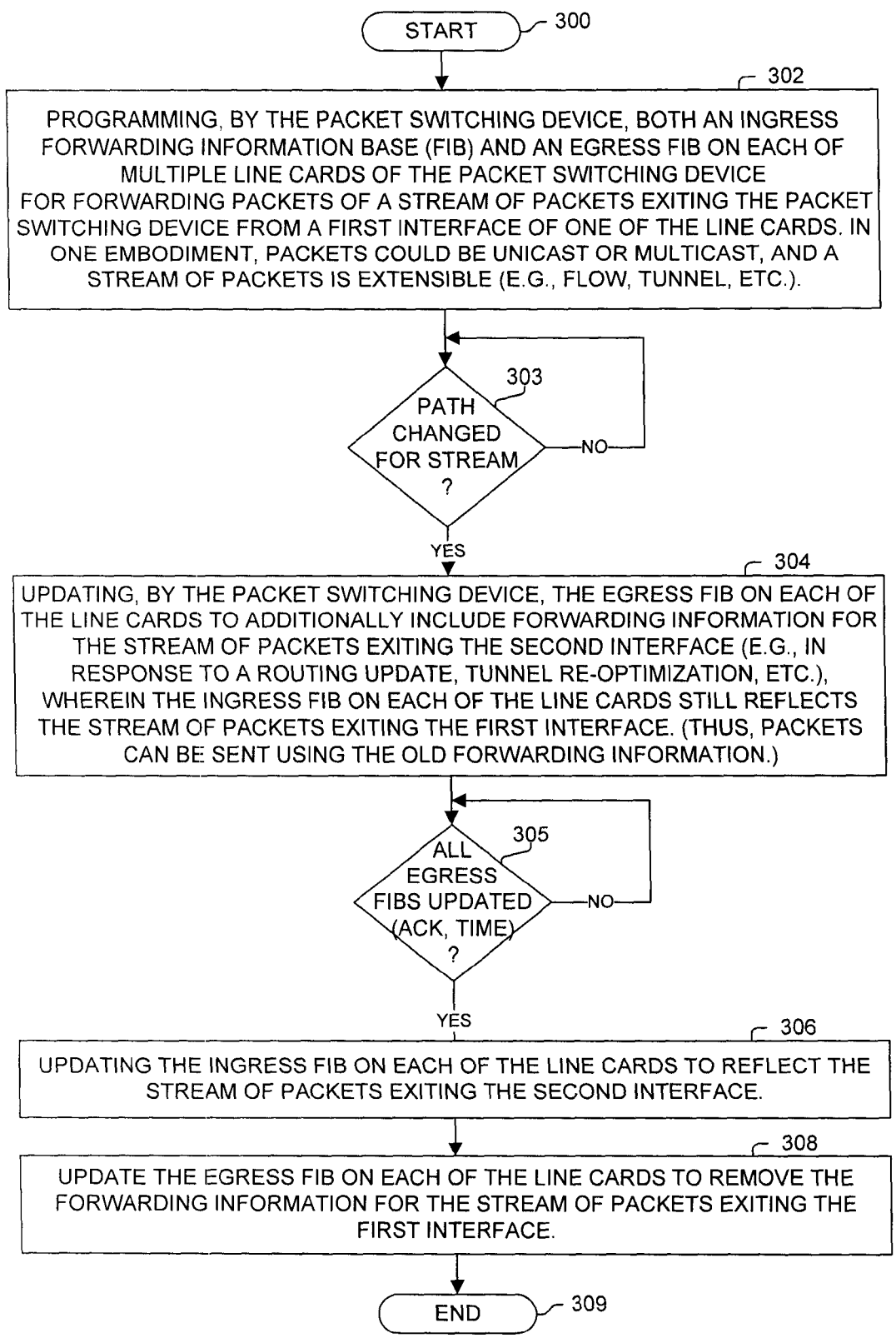
FIG. 3 illustrates a process performed in one embodiment.

FIG. 3 illustrates a process performed in one embodiment. Processing begins with process block 300. In process block 302, the packet switching device programs both an ingress FIB and an egress FIB on each of multiple line cards of the packet switching device for forwarding packets of a stream of packets at least from a first interface (and not a second interface). The ingress and egress FIBs are used in forwarding packets of a stream of packets currently exiting the packet switching device at least from a first interface of one of the line cards. The stream of packets may include unicast or multicast packets (e.g., packet flows, tunnels, distribution trees, etc.).

As determined in process block 303, if the path through the packet switching device has changed to a second interface (e.g., at least one of the one or more output interfaces from which a packet of the stream of packets is to be sent from the packet switching device has changed), then processing proceeds to process block 304 to update the ingress and egress FIBs on the line cards in a manner designed to prevent packet loss or duplication, such as that caused when unsynchronized FIBs are used in multistage packet forwarding operations. Note, this change in path might be in response to a route update, a tunnel re-optimization, etc.

In process block 304, the packet switching device first updates the egress FIB on each of the line cards to additionally include forwarding information for the stream of packets exiting the second interface. In other words, the egress FIBs are updated to include both the previous and new forwarding information. This updated forwarding information may reflect a single egress interface; or may reflect multiple interfaces (e.g., as reflected in an output list of egress interfaces). During this time, the ingress interfaces are still configured to forward the stream of packets to the line cards corresponding to the previous forwarding information (e.g., including out the first interface and not the second interface); and the egress FIBs still include this previous forwarding information.

Processing in process block 305 determines when all of the egress FIBs have been updated. In one embodiment including a multistage packet switching device, the line cards act independently to update their FIBs in response to instructions and forwarding information received from a route processor. Therefore, just because the route processor has sent new forwarding information to a line card does not mean that the changes have been programmed into an ingress FIB and/or egress FIB. Accordingly, one embodiment determines when all egress FIBs have been updated when a route processor (or other entity) has received an acknowledgement from each of the line cards that its respective egress FIB has been updated. One embodiment waits at least a predetermined maximum updated time duration after supplying the egress FIB update to ensure that the FIB update has been installed.

As determined in process block 305, when all of the egress FIBs have been updated, then, in process block 306, the ingress FIB on each of the line cards is updated to reflect the new forwarding information for the stream of packets exiting the second interface. During this transitioning of all of the ingress FIBs, packets of the stream of packets may be forwarded from the packet switching device from both the first and second interfaces. Next, in process block 308, typically the egress FIBs are updated to remove the old forwarding information for the stream of packets exiting the first interface. Processing of the flow diagram of FIG. 3 (illustrating an ingress and egress FIB update procedure designed to eliminate loss or duplication of packets induced by the updating of these FIBs) is complete as indicated by process block 309.

Figure 4A:
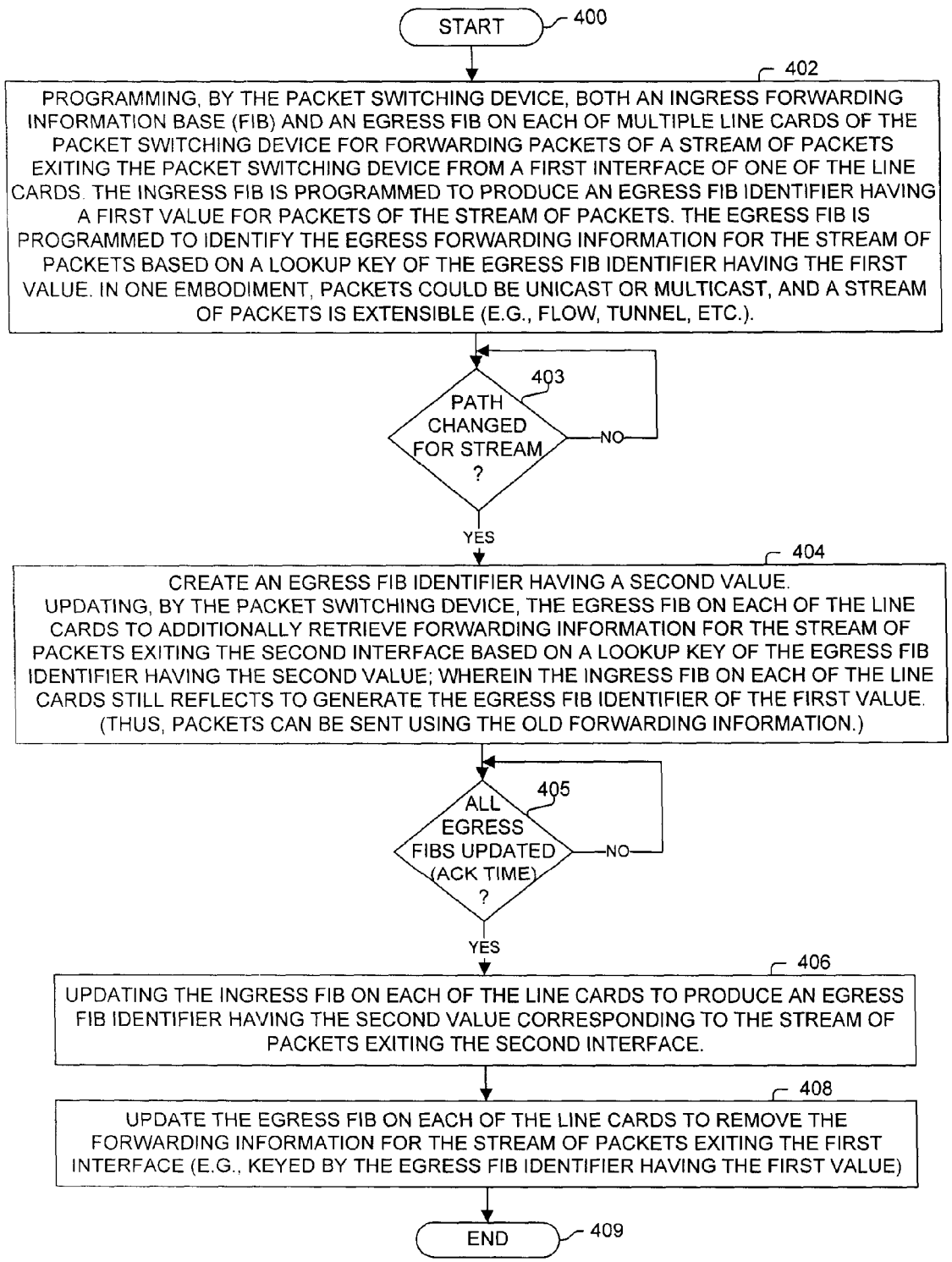
FIG. 4A illustrates a process performed in one embodiment.

FIG. 4A illustrates a process performed in one embodiment. This process is similar to that of FIG. 3, but the processing of FIG. 4A explicitly uses egress FIB identifiers to aid in the transitioning of FIBs from previous to updated forwarding information. As discussed herein in regards to one embodiment, an ingress lookup operation for a particular packet generates an egress FIB identifier and an identification of an egress line card. The egress FIB identifier is typically a local value internally used, and kept within, the packet switching device and is associated with the particular packet. The egress FIB lookup operation uses the egress FIB identifier as a lookup key in the egress FIB to retrieve the corresponding forwarding information. One embodiment: creates an new egress FIB identifier for updated forwarding information; updates all the egress FIBs to also include the updated forwarding information associated with the new egress identifier (in addition to storing the old forwarding information associated with the old egress identifier); and when all egress FIBs have been updated, then updates the ingress FIBS to generate the new egress FIB identifier and identification of corresponding egress line card for the updated forwarding information.

Turning expressly to FIG. 4A, processing begins with process block 400. In process block 402, the packet switching device programs both an ingress FIB and an egress FIB on each of multiple line cards of the packet switching device to use an egress FIB identifier having a first value for forwarding packets of a stream of packets at least from a first interface (and not a second interface). The ingress and egress FIBs use the egress FIB identifier having a first value in forwarding packets of a stream of packets currently exiting the packet switching device at least from a first interface of one of the line cards. The stream of packets may include unicast or multicast packets (e.g., packet flows, tunnels, distribution trees, etc.). Thus, the ingress FIBs are programmed to generate the egress FIB identifier having the first value; and the egress FIBs are programmed to identify this forwarding information based on the egress FIB identifier having the first value.

As determined in process block 403, if the path through the packet switching device has changed to a second interface (e.g., at least one of the one or more output interfaces from which a packet of the stream of packets is to be sent from the packet switching device has changed), then processing proceeds to process block 404 to update the ingress and egress FIBs on the line cards in a manner designed to prevent packet loss or duplication, such as that caused when unsynchronized FIBs are used in multistage packet forwarding operations. Note, this change in path might be in response to a route update, a tunnel re-optimization, etc.

In process block 404, the packet switching device first creates an egress FIB identifier having a second value, and updates the egress FIB on each of the line cards to additionally include forwarding information for the stream of packets exiting the second interface based on the egress FIB identifier having the second value. In other words, the egress FIBs are updated to include both (a) the previous forwarding information which can be retrieved based on the egress FIB identifier having the first value; and (b) the new forwarding information which can be retrieved based on the egress FIB identifier having the second value. This updated forwarding information may reflect a single egress interface; or may reflect multiple interfaces (e.g., as reflected in an output list of egress interfaces). During this time, the ingress interfaces are still configured to forward the stream of packets to the line cards corresponding to the previous forwarding information (e.g., including out the first interface and not the second interface) by generating the egress FIB identifier having the first value; and the egress FIBs still include this previous forwarding information.

Processing in process block 405 determines when all of the egress FIBs have been updated. In one embodiment including a multistage packet switching device, the line cards act independently to update their FIBs in response to instructions and forwarding information received from a route processor. Therefore, just because the route processor has sent new forwarding information to a line card does not mean that the changes have been programmed into an ingress FIB and/or egress FIB. Accordingly, one embodiment determines when all egress FIBs have been updated when a route processor (or other entity) has received an acknowledgement from each of the line cards that its respective egress FIB has been updated. One embodiment waits at least a predetermined maximum updated time duration after supplying the egress FIB update to ensure that the FIB update has been installed.

As determined in process block 405, when all of the egress FIBs have been updated, then, in process block 406, the ingress FIB on each of the line cards is updated to reflect the new forwarding information for the stream of packets exiting the second interface including by generating the egress FIB identifier having the second value. During this transitioning of all of the ingress FIBs, packets of the stream of packets may be forwarded from the packet switching device from both the first and second interfaces as some ingress FIBs may generate the egress FIB identifier having the first value while some generate the egress FIB identifier having the second value. Next, in process block 408, typically the egress FIBs are updated to remove the old forwarding information for the stream of packets exiting the first interface (e.g., removing the forwarding information and lookup key of the egress FIB identifier having the first value). Processing of the flow diagram of FIG. 4 (illustrating an ingress and egress FIB update procedure designed to eliminate loss or duplication of packets induced by the updating of these FIBs) is complete as indicated by process block 409.

Figure 4B:
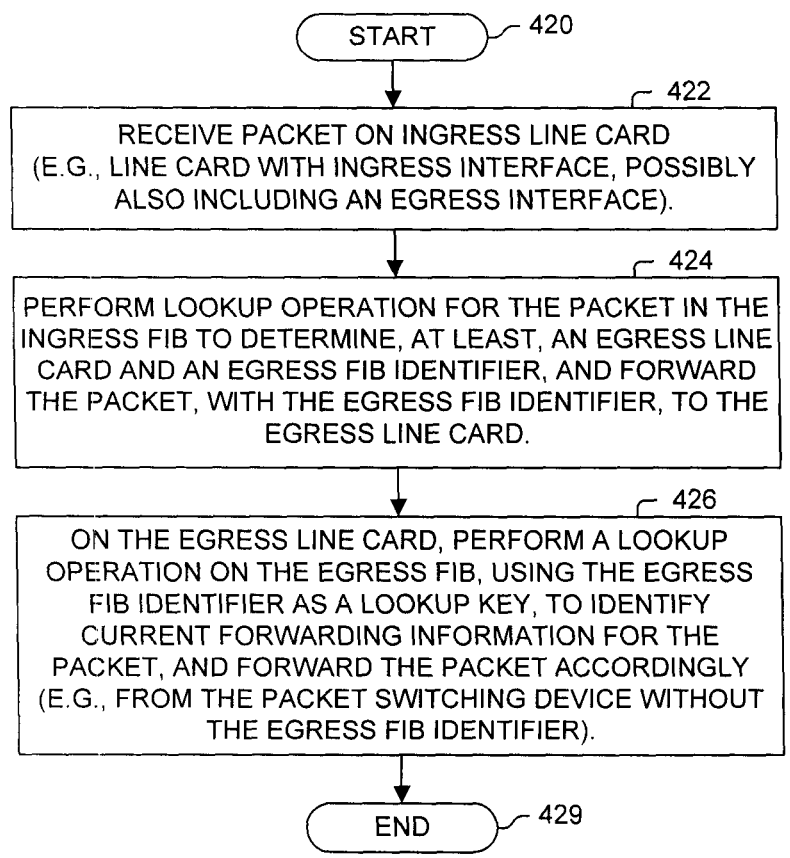
FIG. 4B illustrates a process performed in one embodiment.

FIG. 4B illustrates a process used in one embodiment by a packet switching device for forwarding packets received on an ingress line card, through and from the packet switching device. Processing begins with process block 420. In process block 422, a packet is received on an ingress line card (e.g., a line card with an ingress interface, with the line card possibly also having an egress interface). In process block 424, a lookup operation is performed for the packet in the ingress FIB to determine, at least, an egress line card and an egress FIB identifier; with the packet being forwarded (with the egress FIB identifier) to the egress line card (e.g., a line card with an egress interface, with the line card possibly also having an ingress interface). Note, for packets to be sent out multiple interfaces, the ingress lookup will identify these multiple interfaces. In process block 426, a lookup operation is performed using the egress FIB identifier as a lookup key in the egress FIB to obtain the current forwarding information for the packet. The packet, without the egress FIB identifier, is then forwarded from the identified interface of the egress line card of the packet switching device. In the case of a packet that is sent out multiple interfaces of the egress line card, these multiple interfaces will be identified with a packet (without the egress FIB identifier) sent out of each of these multiple interfaces. For example, in one embodiment, an egress lookup operation might identify an output list that is traversed to identify each of multiple interfaces from which to send a packet. For example, a tunnel might include multiple pseudowires with the output list identifying from which interface(s) to forward a packet sent over a tunnel. Thus, a single egress FIB identifier is used in one embodiment as a key to an egress FIB lookup operation to identify a tunnel and associated pseudowire(s); and when a change in a path of a tunnel occurs, such as in response to a re-optimization of the tunnel, the updating of the tunnel and associated pseudowires can be accomplished as discussed herein using a new egress FIB identifier to perform the updates in a manner designed to prevent packet loss or duplication caused when unsynchronized FIBs are used in a multistage packet switching device. Processing of the flow diagram of FIG. 4B is complete as indicated by process block 429.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
  updating, by a packet switching device using multistage forwarding lookup operations, an egress forwarding information base (egress FIB) on each of a plurality of line cards of the packet switching device to additionally include forwarding information for a stream of packets exiting a second interface of one of the plurality of line cards in addition to forwarding information currently used for forwarding packets of the stream of packets from a first interface of the plurality of line cards; and
  in response to identifying that said egress FIB has been said updated on each of the plurality of line cards: updating an ingress forwarding information base (ingress FIB) on at least one line card of the packet switching device to reflect the stream of packets exiting the second interface instead of the stream of packets exiting the first interface;
  wherein said operation of identifying that said egress FIB has been said updated on each of the plurality of line cards includes waiting until each of the plurality of line cards has acknowledged that their respective egress FIB has been said updated.

2. The method of claim 1, wherein said at least one line card of the packet switching device includes at least two line cards of the packet switching device; and wherein said operation of updating the ingress FIB is performed on each of said at least two line cards of the packet switching device.

3. The method of claim 2, wherein subsequent to beginning and before completing said operation of updating the ingress FIB on each of said at least two line cards: at least one packet of the stream of packets is forwarded from the first interface, and at least one packet of the stream of packets is forwarded from the second interface.

4. The method of claim 1,
wherein each of said multistage forwarding lookup operations for a particular packet of the stream of packets includes:
performing an ingress lookup operation in the ingress FIB on one of said at least one line card to identify a particular line card of the plurality of line cards and an egress FIB identifier; and
performing an egress lookup operation using said identified egress FIB identifier as a lookup key on the egress FIB on the particular line card to identify an interface from which to forward the particular packet; and
wherein said operation of updating the egress FIB on each of the plurality of line cards includes: adding a forwarding entry for a different egress FIB identifier for the stream of packets exiting the second interface, with said different egress FIB identifier being different than the egress FIB identifier for the stream of packets exiting the first interface; and
wherein said operation of updating said ingress FIB on said at least one line card includes: modifying said ingress FIB to result in the identification of said different egress FIB identifier for packets of the stream of packets.

5. The method of claim 4, wherein the egress FIB identifier is not included in a packet of the stream of packets exiting the packet switching device.

6. The method of claim 5, including subsequent to completing said operation of updating an ingress FIB on at least one line card of the packet switching device: updating the egress FIB on each of the plurality of line cards to remove forwarding information keyed to the egress FIB identifier corresponding to the stream of packets exiting the first interface.

7. A packet switching device, comprising:
a plurality of line cards configured to forward packets using multistage forwarding lookup operations, with the plurality of line cards, including:
at least one line card, each including an ingress forwarding information base (ingress FIB), configured to forward externally-received packets through the packet switching device based on an ingress lookup operation in said respective ingress FIB; and
at least two line cards, each including an egress forwarding information base (egress FIB), configured to forward packets from the packet switching device based on an egress lookup operation in said respective egress FIB;
one or more communication mechanisms for communicating packets between the plurality of line cards; and
a route processor configured to update said ingress FIB, for a particular stream of packets, on each of said at least one line card in response to ensuring that the egress FIB on each of said at least two line cards has been updated for the packet switching device to include, in addition to forwarding information already contained in the egress FIB for forwarding packets of the particular stream of packets from a first interface of one of said at least two line cards, forwarding information for forwarding packets of the particular stream of packets from a different interface of one of said at least two line cards;
wherein said ensuring that the egress FIB on each of said at least two line cards has been updated includes waiting until each of said at least two line cards has acknowledged that their respective egress FIB has been updated.

8. The packet switching device of claim 7, wherein said at least one line card includes at two or more line cards.

9. The packet switching device of claim 7,
wherein each of said multistage forwarding lookup operations for the particular packet of the stream of packets includes:
performing a particular ingress lookup operation in the ingress FIB on one of said at least one line card to identify a particular line card of said at least two line cards and an egress FIB identifier; and
performing a particular egress lookup operation using said identified egress FIB identifier as a lookup key on the egress FIB on the particular line card to identify an interface from which to forward the particular packet; and
wherein said updated egress FIB on each of said at least two line cards includes:
a forwarding entry for a first egress FIB identifier for the stream of packets exiting the first interface, and
a forwarding entry for a different egress FIB identifier for the stream of packets exiting the different interface, with said different egress FIB identifier being different than the first egress FIB identifier; and
wherein said updating of said ingress FIB on each of said at least one line card includes: modifying said ingress FIB to result in the identification of said different egress FIB identifier for packets of the stream of packets.

10. The packet switching device of claim 9, wherein identified egress FIB identifier is not propagated outside the packet switching device in one of said packets of the particular stream of packets.

11. The packet switching device of claim 9, wherein the particular stream of packets correspond to packets within a packet tunnel; and wherein the router processor is configured to said update the forwarding information in the ingress FIB on each of said at least one line card and the egress FIB on each of said at least two line cards in response to re-optimization of the packet tunnel.

12. The packet switching device of claim 7, wherein the first interface and the different interface are on different line cards of the plurality of line cards.

13. A method, comprising:
programming, by a packet switching device, both an ingress forwarding information base (FIB) and an egress FIB on each of a plurality of line cards of the packet switching device for use in multistage forwarding lookup operations for forwarding packets over a tunnel exiting the packet switching device from a first interface of one of the plurality of line cards;
subsequent to said programming operation and while using the tunnel exiting the packet switching device from the first interface: updating, by the packet switching device, said egress FIB on each of the plurality of line cards to include forwarding information for the tunnel exiting the second interface in addition to forwarding information for the tunnel exiting the first interface; and
updating said ingress FIB on each of the plurality of line cards to reflect the tunnel exiting the second interface in response to determining that said operation of updating said egress FIB on each of the plurality of line cards to include forwarding information for the tunnel exiting the second interface has completed based on each of the plurality of line cards having acknowledged that their respective egress FIB has been said updated.

14. The method of claim 13, wherein subsequent to said egress FIB being updated on each of the plurality of line cards and completion of said operation of updating said ingress FIB on each of the plurality of line cards to reflect the tunnel exiting the second interface: at least one packet is forwarded from the tunnel from the first interface, and at least one packet is forwarded from the tunnel from the second interface.

15. The method of claim 13,
wherein a multistage forwarding lookup operation of said multistage forwarding lookup operations includes: performing an ingress FIB lookup operation in one of said ingress FIBs resulting in an identification of an egress FIB identifier internal to the packet switch, and performing an egress lookup operation using the egress FIB identifier as a lookup key in one of said egress FIBs in identifying how to forward the packet from the packet switching device; and
wherein said operation of updating said egress FIB on each of the plurality of line cards to additionally include forwarding information for the tunnel exiting the second interface includes: updating said egress FIB on each of the plurality of line cards to include a different egress FIB identifier corresponding to the second interface, with said different egress FIB identifier being different than the egress FIB identifier for the tunnel exiting the first interface.

16. The method of claim 15, wherein a path of the tunnel taken through the packet switching device is changed to exit the second interface in response to re-optimization of the tunnel.

* * * * *